United States Patent
Vemulapalli et al.

(10) Patent No.: US 9,448,852 B2
(45) Date of Patent: Sep. 20, 2016

(54) MANAGING VIRTUAL MACHINES

(75) Inventors: Eswar Vemulapalli, Foster City, CA (US); Ted Tran, Union City, CA (US); Houman Behzadi, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1035 days.

(21) Appl. No.: 12/549,529

(22) Filed: Aug. 28, 2009

(65) Prior Publication Data
US 2011/0055714 A1    Mar. 3, 2011

(51) Int. Cl.
*G06F 9/44*    (2006.01)
*G06F 9/455*   (2006.01)
*G06F 15/16*   (2006.01)
*G06F 9/50*    (2006.01)

(52) U.S. Cl.
CPC ......... *G06F 9/5077* (2013.01); *G06F 9/45558* (2013.01); *G06F 2009/45562* (2013.01)

(58) Field of Classification Search
CPC . G06F 9/45558; G06F 9/5077; G06F 9/4443
USPC ........ 709/222, 223, 224, 225, 226; 715/739, 715/734, 744
See application file for complete search history.

(56) References Cited

U.S. PATENT DOCUMENTS

| | | |
|---|---|---|
| 6,904,449 B1 | 6/2005 | Quinones |
| 7,200,589 B1 | 4/2007 | Graupner |
| 7,506,265 B1 * | 3/2009 | Traut et al. .................... 715/763 |
| 2007/0250833 A1 * | 10/2007 | Araujo et al. .................... 718/1 |
| 2007/0266136 A1 * | 11/2007 | Esfahany et al. ............. 709/223 |
| 2008/0098309 A1 * | 4/2008 | Fries et al. ..................... 715/734 |
| 2008/0196043 A1 * | 8/2008 | Feinleib et al. ............... 719/319 |
| 2008/0244579 A1 * | 10/2008 | Muller .......................... 718/100 |
| 2008/0307414 A1 * | 12/2008 | Alpern et al. .................... 718/1 |
| 2009/0089078 A1 | 4/2009 | Bursey |
| 2009/0187642 A1 * | 7/2009 | McGrath ........................ 709/220 |
| 2009/0282404 A1 * | 11/2009 | Khandekar et al. .......... 709/226 |
| 2009/0300608 A1 * | 12/2009 | Ferris et al. ...................... 718/1 |
| 2010/0223610 A1 * | 9/2010 | Dehaan ..................... G06F 8/63 717/178 |

OTHER PUBLICATIONS

Sotomayor et al., Overhead Matters: A Model for Virtual Resource Management, 2006, Virtualization Technology in Distributed Computing, VTDC 2006. First International Workshop on (0-7695-2873-1).*

Amazon Web Services, "Amazon Elastic Compute Cloud (Amazon EC2)," [online], no date given [retrieved on Nov. 1, 2011]. Retrieved from the Internet:< URL: http://aws.amazon.com/ec2/>.

(Continued)

*Primary Examiner* — Jordany Nunez
(74) *Attorney, Agent, or Firm* — Kilpatrick Townsend & Stockton LLP

(57) ABSTRACT

Tools and techniques for managing virtual machines, including without limitation virtual machines running in a cloud computing environment. Certain tools provide a user interface that allows a user to browse machine images to find an image that meets the user's needs. In some aspects, these tools and techniques can provide the ability for users to customize machine images to meet their own needs and/or to share their customized machine images with other users. In other aspects, these tools and techniques can provide users with the ability to export virtual machines for use on an actual computer system.

19 Claims, 8 Drawing Sheets

(56) References Cited

OTHER PUBLICATIONS

Culver, Mike, "IBM WebSphere Portal Server & IBM Lotus Web Content Management Standard Edition (64-bit)," [online], created Apr. 21, 2009 [retrieved on Nov. 1, 2011] Retrieved from the Internet: <URL: http://developer.amazonwebservices.com/connect/entry.jspa?externalID=2394&ref=featured>.

Hodak, William, "Oracle Database 11g Release 1 (11.1.0.6) Enterprise Edition (64-bit)," [online] created Sep. 22, 2008 [retrieved on Nov. 1, 2011] Retrieved from the Internet: <URL: http://developer.amazonwebservices.com/connect/entry.jspa?externalID=1717&categoryID=205>.

* cited by examiner

MANAGING VIRTUAL MACHINES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools and techniques for managing virtualized computer systems.

BACKGROUND

The use of "cloud computing," in which a single computer system (which itself may be made up of many different processors, memory resources, and/or nonvolatile storage resources) hosts a large number of "virtual machines" has become increasingly popular recently. Such environments provide on-demand scalability, increased reliability, and decreased capital costs for users, who no longer are forced to purchase dedicated hardware on which to run their applications. An example of such a cloud computing environment is Amazon Web Services™.

In a typical cloud computing scenario, a customer will install an operating system, any necessary middleware, and one or more applications onto a virtual machine in the cloud computing environment. This virtual machine (which essentially comprises an allocated subset of the cloud's processing, memory, and/or nonvolatile storage resources) typically appears to the operating system and applications as dedicated hardware (an "actual machine"). One benefit of the cloud computing paradigm is that this software configuration can be saved as "machine image," which can be stored as a backup, etc.

More recently, as an enhancement to their customer offerings, several cloud computing providers have begun to offer machine images that are preconfigured with specified software, to eliminate the need for customers to perform their own software installations on their virtual machines. One example of such preconfigured offerings are the Amazon Machine Images™ that are configured to run on Amazon Web Services™. Using this technology, customers can select a machine image that is preconfigured with the software they need, pay any necessary license fees for the software, and have a configured software installation ready to use in fairly short order. To date, however, there are few, if any, acceptable tools for managing virtual machines in such environments. Typically, a customer will have to undertake a process of searching and guesswork to identify a machine image that will suit his or her needs.

The cloud computing paradigm is particularly well-suited to providing software for demonstration and/or testing purposes. For example, many software companies create demonstration installations of enterprise software packages, in order to demonstrate features that might be of particular advantage to a particular customer. Similarly, many software developers have a need to test applications under development under a wide variety of operating systems and configurations, and the information technology departments of companies typically prefer to install new software into a test environment before installing it in a production environment. Many users do not have the financial resources to purchase dedicated hardware for demonstration or testing uses, however, and such uses are typically transitory in nature, so that even customers who might have the resources to purchase dedicated hardware for such uses find that such a purchase. A problem with the use of virtual machines for testing or demonstration, however, is that users often like to run their production systems on dedicated hardware. Accordingly, if a user is satisfied with a tested or demonstrated configuration, the user typically has to duplicate the installation process on an actual computer system operated by that user. This process can be frustrating, as configuration of complex applications is typically an expensive and time-consuming process.

BRIEF SUMMARY

Certain embodiments provide tools and techniques for managing virtual machines, including without limitation virtual machines running in a cloud computing environment. In an aspect of certain embodiments, these tools provide a user interface that allows a user to browse machine images to find an image that meets the user's needs. In certain embodiments, these tools and techniques provide the ability for users to customize machine images to meet their own needs and/or to share their customized machine images with other users. This feature can be beneficial for demonstration applications, in which multiple members of a sales force might have need for similarly-customized application environments. Moreover, another user can further customize (and/or save a customized version of) this customized machine image. In other aspects, these tools and techniques provide users with the ability to provide ratings and/or other comments about machine images, allowing for community interaction with regard to such machine images.

In another aspect of some embodiments, the user interface allows a user to store a machine image for later user (and/or store and re-instantiate a machine image iteratively for intermittent use). In some cases, the tools can be configured to account for (e.g., bill the user for) time in which the machine image is actually instantiated, rather than requiring the user to pay for cloud computing resources when the user is not actually using the virtual machine. Optionally, the user interface may be configured to provide accounting information to the user, such as the amount of time (over a certain period, etc.) that the virtual machine has been instantiated, what charges have accrued from this instantiation time, and the like. Beneficially, this feature can allow users to track their usage and/or tailor their usage to meet budgetary constraints.

In yet another aspect, the tools provided by certain embodiments provide the ability for a user to export a machine image for use on an actual computer system. This feature can be beneficial because it can allow a user to set up a virtual machine for demonstration and/or testing and then later export the same application environment to a production system outside the cloud computing environment. This can allow for demonstration and/or testing without requiring heavy capital expenditures on dedicated hardware, while still allowing an easy path to production use without requiring complete configuration of the application environment on a production system.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods provided by various embodiments. Similarly, a computer program might comprise a set of instructions that are executable by a computer system (and/ or a processor therein) to perform such operations. In many cases, such software programs are encoded on physical and/or tangible computer readable media (such as, merely by way of example, optical media, magnetic media, and/or the like).

Merely by way of example, one set of embodiments provides computer systems. An exemplary computer system comprises one or more processors and a computer readable medium in communication with the one or more processors. In an aspect, the computer readable medium has encoded thereon a set of instructions executable by the computer system to perform one or ore operations. Various embodiments might employ a wide variety of such instructions, some examples of which are described below.

Another set of embodiments provides methods, including without limitation methods that may be performed, in whole or in part, by a machine, such as a computer system. One exemplary method comprises providing a user interface for users to browse a plurality of machine images stored in a cloud computing environment. In an aspect, each of the plurality of machine images might correspond to a virtualized computer system. In another aspect, the user interface might provide information about each of the machine images, including without limitation user comments about one or more of the machine images.

In some embodiments, the method further comprises receiving, from a first user and via the user interface, a selection of a first machine image corresponding to a first virtualized computer system; in an aspect, the first virtualized computer system comprises an application environment. The method might further include creating, in response to the selection of the first machine image, a second machine image based on the first machine image; the second machine image might correspond to a second virtualized computer system comprising the application environment. The method, in particular embodiments, might comprise instantiating the second virtualized computer system, based on the second machine image, to display the application environment of the second virtualized computer system for the first user and/or allow the first user to interact with the application environment of the second virtualized computer system.

In some embodiments, the method further comprises customizing the application environment of the second virtualized computer system, based at least in part on user interaction with the application environment of the second virtualized computer system, such that the second virtualized computer system comprises a customized application environment. This second machine image, corresponding to the second virtualized computer system, then may be stored in the cloud computing environment.

A method in accordance with another set of embodiments might comprise providing a user interface for users to manage one or more of a plurality of machine images stored in a cloud computing environment; in an aspect, each of the plurality of machine images corresponds to a virtualized computer system. The method might further comprise receiving, from a first user and via the user interface, a selection of a first machine image corresponding to a first virtualized computer system, the first virtualized computer system comprising an application environment.

In some embodiments, the method further comprises creating, in response to the selection of the first machine image, a second machine image based on the first machine image, the second machine image corresponding to a second virtualized computer system comprising the application environment, and/or instantiating the second virtualized computer system, based on the second machine image, to display the application environment of the second virtualized computer system for the first user and allow the first user to interact with the application environment of the second virtualized computer system. In some cases, the method further comprises customizing the application environment of the second virtualized computer system, based at least in part on user interaction with the application environment of the second virtualized computer system, such that the second virtualized computer system comprises a customized application environment.

In a particular set of embodiments, the method further comprises receiving user input indicating that that the customized application environment should be exported. The method, in such embodiments, might further comprise exporting the customized application environment for installation on an actual computer system, based at least in part on the user input.

Yet another set of embodiments provides an apparatus, which might comprise a computer readable medium having encoded thereon a set of instructions by a computer system to perform one or more operations. In an exemplary embodiment, this set of instructions might comprise instructions for providing a user interface for users to browse a plurality of machine images stored in a cloud computing environment. As noted above, in an aspect, each of the plurality of machine images might correspond to a virtualized computer system, and/or the user interface might provide information about each of the machine images, such as (to name one example), user comments about one or more of the machine images;

In other embodiments, the set of instruction might further comprise instructions for receiving, from a first user and via the user interface, a selection of a first machine image corresponding to a first virtualized computer system, which might comprise an application environment. Additionally and/or alternatively, the set of instructions can include instructions for creating (perhaps in response to the selection of the first machine image) a second machine image based on the first machine image. This second machine image might correspond to a second virtualized computer system comprising the application environment.

In a set of embodiments, the set of instructions further comprises instructions for instantiating the second virtualized computer system, based on the second machine image, to display the application environment of the second virtualized computer system for the first user and allow the first user to interact with the application environment of the second virtualized computer system. There may also be instructions for customizing the application environment of the second virtualized computer system, based at least in part on user interaction with the application environment of the second virtualized computer system; after such modification, the second virtualized computer system can be thought of as comprising a customized application environment. Accordingly, the set of instructions might further include instructions for storing the second machine image, corresponding to the second virtualized computer system, in the cloud computing environment.

In a particular embodiment, the set of instructions might further comprise instructions for exporting the customized application environment for installation on an actual computer system, based at least in part on user input indicating that that the customized application environment should be exported. This might allow, for example, a customized application environment for demonstrating an application for a potential customer to be exported for installation on a computer system operated by the potential customer, or a customized application environment for testing an application to be exported for installation on a production computer system.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
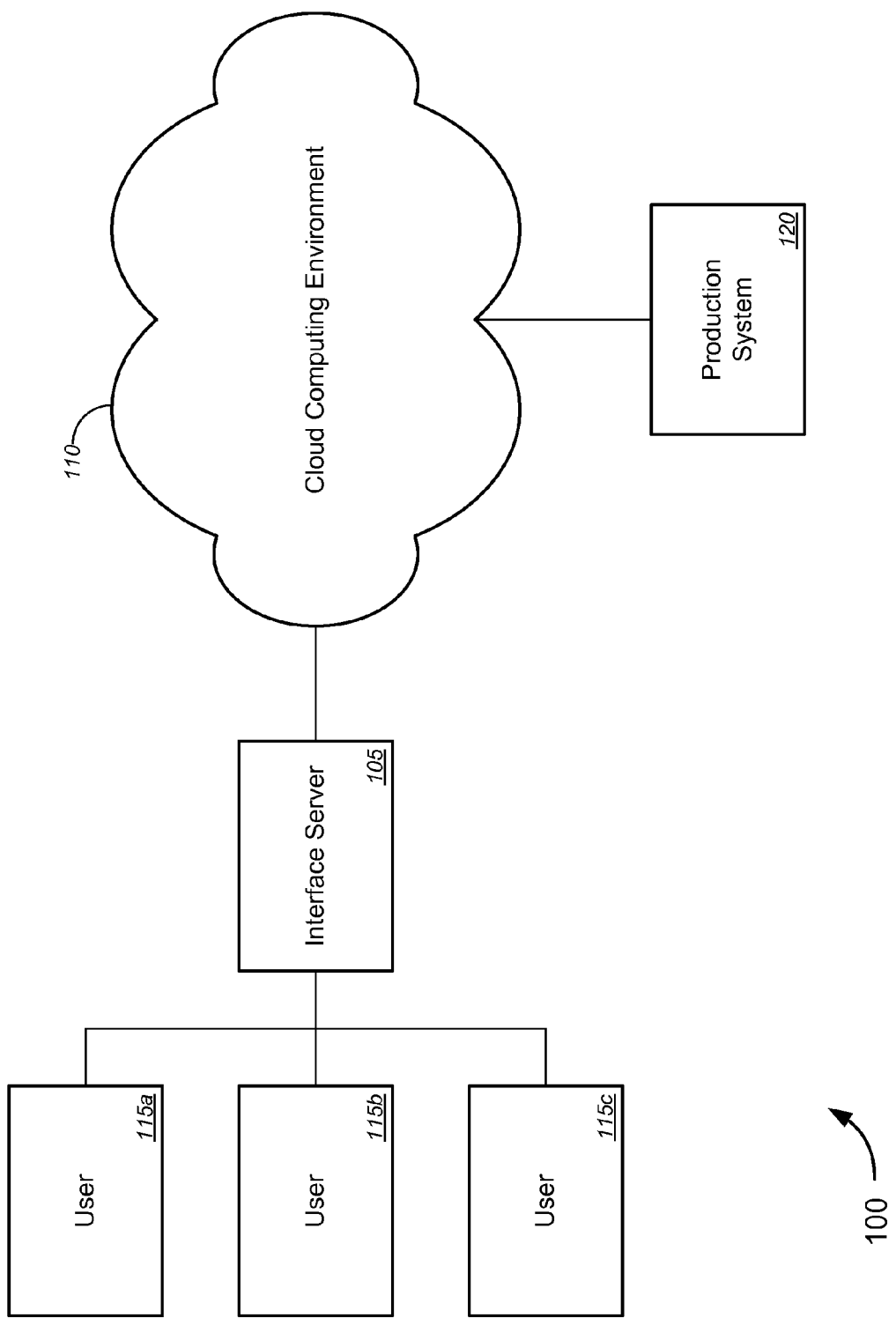
FIG. 1 is a block diagram illustrating a system for managing virtual machines, in accordance with various embodiments.

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

One set of embodiments provides tools and techniques for managing virtual machines, including without limitation virtual machines running in a cloud computing environment. As used herein, the term "cloud computing environment" means any system that provides a set of pooled resources (e.g., processing capabilities, memory, persistent storage) that can be allocated to one or more virtual machines. A "virtual machine" is a software implementation of a machine (i.e., a computer system) that can execute programs like a real machine; in a cloud computing environment, therefore, a virtual machine is a virtualized computer system (as contrasted with an "actual computer system," which comprises a discrete set of hardware on which an application environment is installed in the traditional fashion) that consumes an allocated set of the cloud computing environment's pooled resources to provide an application environment in which one or more applications can be run. In an aspect, the virtual machine appears to the application(s) (and, in some cases to users of those applications) to be a dedicated hardware platform on which the applications can execute to provide services to users, while it actually is merely a software-based environment that consumes resources allocated from the cloud computing environment to host the application environment. As used herein, the term "application environment" means one or more applications, along with any supporting software framework (e.g., operating system, database management system, middleware, etc.) that is necessary for the application(s) to execute properly. As a non-limiting example, an application environment might comprise Oracle E-Business Suite™ (an application suite), Oracle Database 11g™ (a relational database management system), and Solaris™ (an operating system), along with assorted drivers, etc. that provide integration between the application environment and the machine (whether real or virtual).

To be used, a virtual machine must be instantiated, a process by which resources (e.g., from a cloud computing environment) are allocated for use by the virtual machine. Unlike an actual machine, if a virtual machine is "turned off," it ceases to exist. However, a virtual machine can be saved and stored as a "machine image," which is a file (or set of files) that preserve the state of the virtual machine and the application environment running on the virtual machine. Thus, a virtual machine may be instantiated, and a machine image can be created from the virtual machine. If the virtual machine is stopped (turned off), the virtual machine can be re-instantiated later, and the state of the re-instantiated virtual machine (and its application environment will be the same as it was at the time the machine image was created. A machine image, therefore, can be stored in persistent storage (within the cloud computing environment or elsewhere) and later used to re-instantiate the virtual machine.

In an aspect of certain embodiments, users can create, copy, and modify machine images to create virtual machines having particular characteristics (e.g., particular application environments, etc.) Beneficially, some embodiments provide a user interface that allows a user to browse machine images to find an image that meets the user's needs. In some aspects, this user interface users with the ability to customize machine images to meet their own needs and/or to share their customized machine images with other users. This feature can be beneficial for demonstration applications, in which multiple members of a sales force might have need for similarly-customized application environments. Moreover, another user can further customize (and/or save a customized version of) this customized machine image. In other aspects, the tools provided by certain embodiments allow users to provide ratings and/or other comments about machine images. Accordingly, certain embodiments enable a user to find, implement, customize, and/or save a virtual machine without the need for high-level knowledge about the cloud computing environment. For example, a typical sales force might not have the technical experience to implement a virtual machine in a traditional cloud computing environment for purposes of demonstrating an application to potential customers; the tools provided by certain embodiments, however, provide a flexible and convenient interface to facilitate such interaction.

In other aspects, tools provided by certain embodiments provide enhanced flexibility and economy in the use of virtual machines. For example, in some embodiments, the user interface allows a user to store a machine image for later user (and/or store and re-instantiate a machine image iteratively for intermittent use). In some cases, the tools can be configured to account for (e.g., bill the user for) time in which the machine image is actually instantiated, rather than requiring the user to pay for cloud computing resources when the user is not actually using the virtual machine. Optionally, the user interface may be configured to provide accounting information to the user, such as the amount of time (over a certain period, etc.) that the virtual machine has been instantiated, what charges have accrued from this instantiation time, and the like. Beneficially, this feature can allow users to track their usage and/or tailor their usage to meet budgetary constraints.

In yet another aspect, the tools provided by certain embodiments provide the ability for a user to export a machine image for use on an actual computer system. This feature can be beneficial because it can allow a user to set up a virtual machine for demonstration and/or testing and then later export the same application environment to a production system outside the cloud computing environment. This can allow for demonstration and/or testing without requiring heavy capital expenditures on dedicated hardware, while still allowing an easy path to production use without requiring complete configuration of the application environment on a production system.

FIG. 1 illustrates a system 100 for managing virtual machines in accordance with one set of embodiments. While the system 100 of FIG. 1 is illustrated comprehensively for ease of description, it should be appreciated that various embodiments may omit one or more of the components illustrated by FIG. 1. The system 100 comprises an interface server 105 that provides a user interface to promote interaction between a cloud computing environment 110 in one or more users 115, each of whom typically will be operating a user computer, such as a PC, handheld computer, PDA, and/or the like. A variety of user interfaces may be provided in accordance with various embodiments, including without limitation graphical user interfaces that display, for a user, display screens for providing information to the user and/or receiving user input from a user. (Some examples of such display screens are described below.)

Merely by way of example, in some embodiments, the interface server 105 may be configured to communicate with a client computer operated by a user 115 via a dedicated application running on the client computer; in this situation, the user interface might be displayed by the client computer, based on data and/or instructions provided by the interface server. In other embodiments, the user interface may be provided from a web site that is served by the interface server 105 and/or a web server acting on behalf of the interface server 105, e.g., by providing a set of one or more web pages, which may be displayed in a web browser running on the user computer and/or served by a web server (not shown on FIG. 1). In some cases, the interface server 105 might comprise the web server and/or be in communication with the web server, such that the interface server 105 provides data to the web server to be served as web pages for display by a browser at the user computer.

Accordingly, the user interface may be provided as a set of one or more web pages. Alternatively and/or additionally, each user's computer may be configured with a dedicated client application and/or the interface server 105 may provide a dedicated server application; the client application on the user computers may display a user interface based on information received from the interface server 105. Any of a variety of techniques may be used to provide the user interface, in accordance with various embodiments. The interface server 105 may be configured, e.g. with appropriate software, to provide a user interface by performing methods in accordance with various embodiments, including without limitation the methods described below.

As noted above, the cloud computing environment 110 typically will provide a pooled set of resources on which virtual machines can be instantiated and/or on which machine images can be stored. The nature and architecture of the cloud computing environment 105 are discretionary; various embodiments can be used with any of a variety of different types of cloud computing environments, so long as such environments are capable of hosting virtual machines.

In accordance with certain embodiments, the system 100 may comprise a production system 120, which is a dedicated hardware platform for running an application environment. As described in further detail below, in certain embodiments the system 100 (and/or various components thereof) can be used to export a machine image from the cloud computing environment 110. This exported machine image than can be installed on a dedicated computer system, such as the production system 120. This feature can, for example, allow user to demonstrate, evaluate, and/or test an application environment in the cloud computing environment, and thereafter export the application environment for use on the production system 120. A wide variety of computer systems may be used to implement the production system 120, and embodiments are not limited by the nature of the production system 120.

Figure 2:
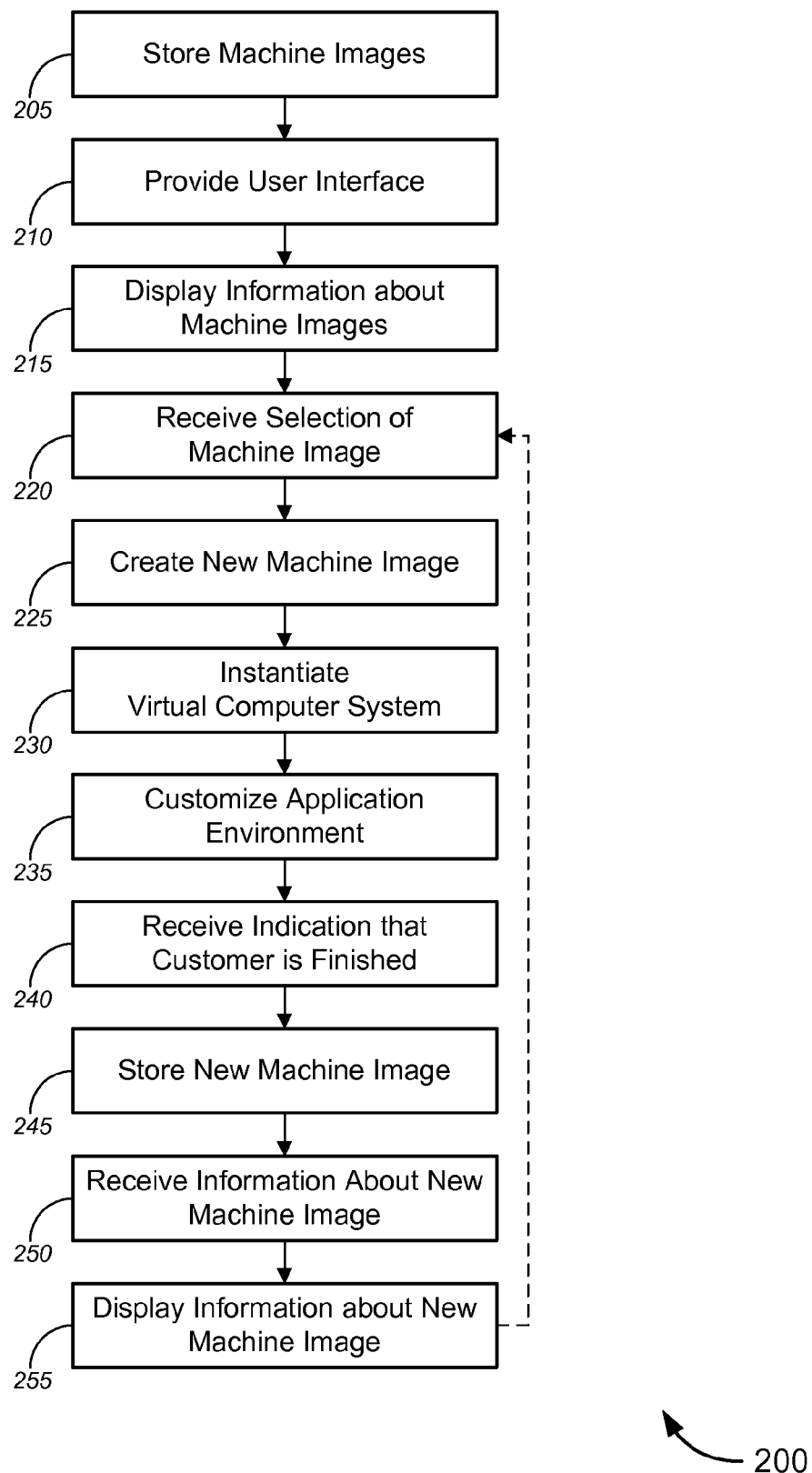
FIG. 2 is a process flow diagram illustrating a method of managing virtual machines, in accordance with various embodiments.
Figure 4:
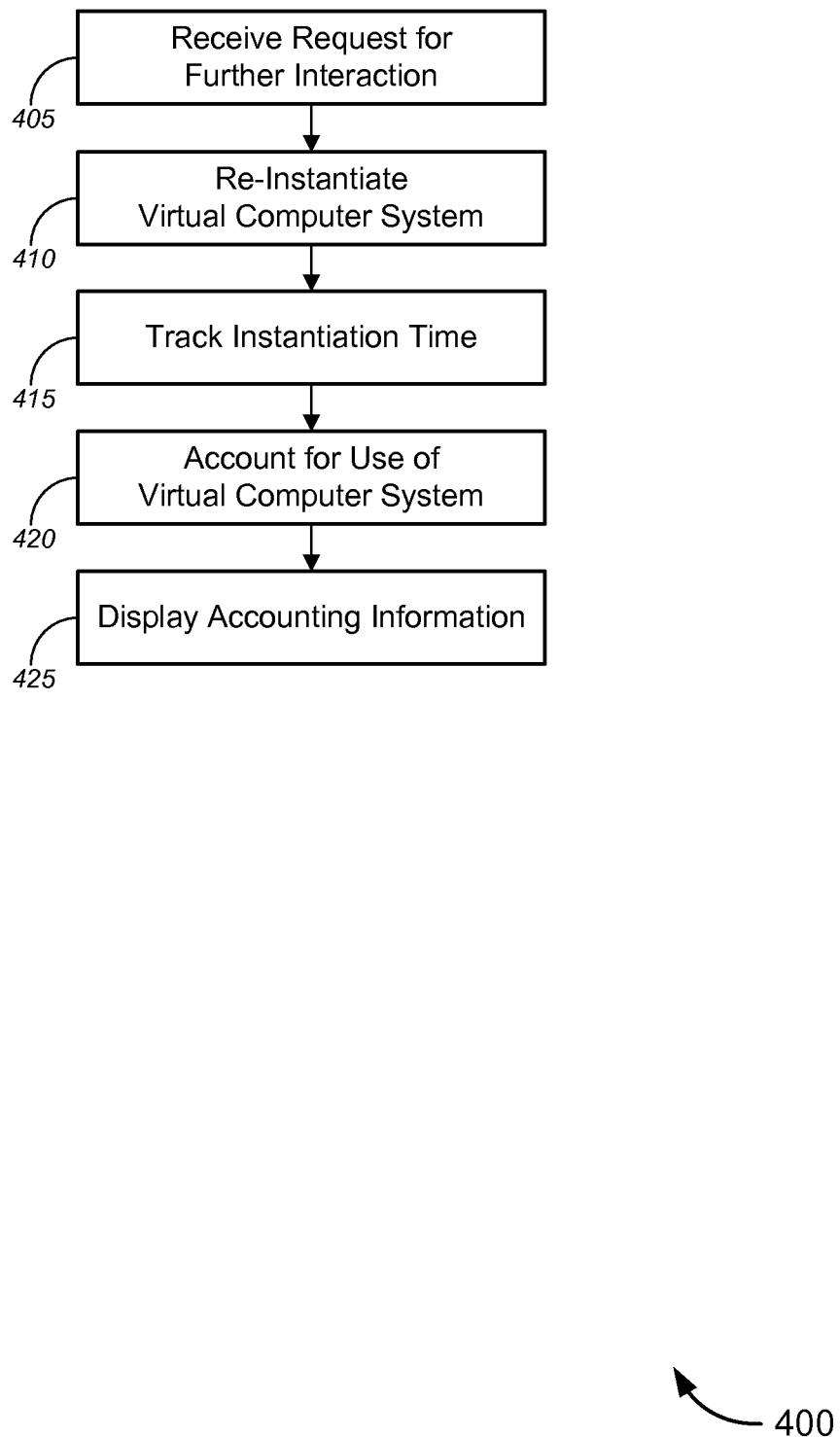
FIG. 4 is a process flow diagram illustrating a method of accounting for usage of virtual machines, in accordance with various embodiments.
Figure 6:
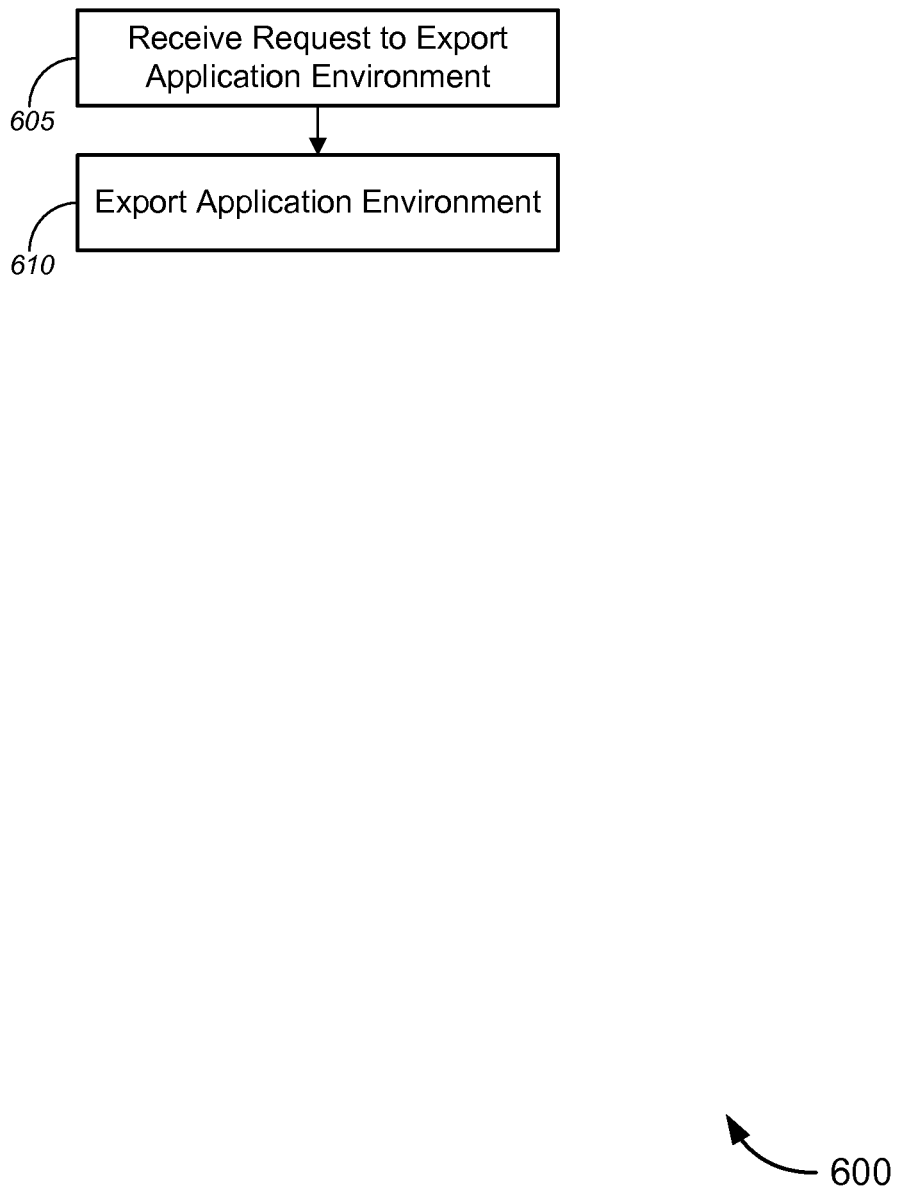
FIG. 6 is a process flow diagram illustrating a method of exporting a virtual machine, in accordance with various embodiments.

FIGS. 2, 4, and 6 illustrate methods that can be used to manage virtual machines in accordance with various embodiments. While the methods of FIGS. 2, 4, and 6 are illustrated, for ease of description, as different methods, it should be appreciated that the various techniques and procedures of these methods can be combined in any suitable fashion, and that, in some embodiments, the methods depicted by FIGS. 2, 4, and 6 can be considered interoperable and/or as portions of a single method. Moreover, while the methods illustrated by FIGS. 2, 4, and 6 can be implemented by (and, in some cases, are described below with respect to) the system 100 of FIG. 1 (or components thereof), these methods can be implemented using any suitable hardware implementation. Similarly, while the system 100 of FIG. 1 (and/or components thereof) can operate according to the methods illustrated by FIGS. 2, 4, and 6 (e.g., by executing instructions embodied on a computer readable medium), the system 100 can also operate according to other modes of operation and/or perform other suitable procedures.

FIG. 2 illustrates a method 200 of managing virtual machines, in accordance with one set of embodiments. The method 200 comprises, in the illustrated embodiment, storing one or more machine images (block 205). In an aspect, these machine images may be stored within a cloud computing environment. In another aspect, each machine image corresponds to a virtualized computer system (i.e., a virtual machine); in other words, each machine image stores the state of a different virtual machine, which can be instantiated based on the information in the machine image.

The method 200 might further comprise providing a user interface to allow users to interact with the cloud computing environment and/or to manage virtual machines (block 210). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, keyboards (both numeric and alphanumeric), microphones, etc. The procedures undertaken to provide a user interface, therefore, can vary depending on the nature of the implementation; in some cases, providing a user interface can comprise displaying the user interface on a display device; in other cases, however, where the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system such as an interface server (and/or a web server in communication with such a computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies. When displayed by a web browser on a user's computer, these web pages can provide interactivity between the user and the interface server (and, by extension, between the user and the cloud computing environment on which the machine images might reside).

In many cases, providing a user interface will comprise providing one or more display screens (a few examples of which are described below), each of which includes one or more user interface elements. As used herein, the term "user interface element" (also described as a "user interface mechanism," or, in cases in which the user interface element can receive input, a "control") means any text, image or device that can be displayed on a display screen (or otherwise conveyed to a user) for providing information to a user and/or for receiving user input. Such elements are commonly referred to as "widgets," and can include, without limitation, text, text boxes, text fields, tables and/or grids, charts, hyperlinks, buttons, lists, combo boxes, checkboxes, radio buttons, and/or the like. While the exemplary display screens described herein employ specific user interface devices appropriate for the type of information to be conveyed/received by the brand notification computer system, it should be appreciated that the choice of user interface element for a particular purpose is typically implementation-dependent and/or discretionary. Hence, the illustrated user interface elements employed by the display screens described herein should be considered exemplary in nature, and the reader should appreciate that other user interface elements could be substituted within the scope of various embodiments. Hence, when this document describes any procedures for displaying (or otherwise providing) information to a user, or to receiving input from a user, the user interface may be the vehicle for the exchange of such input/output.

Figure 3:
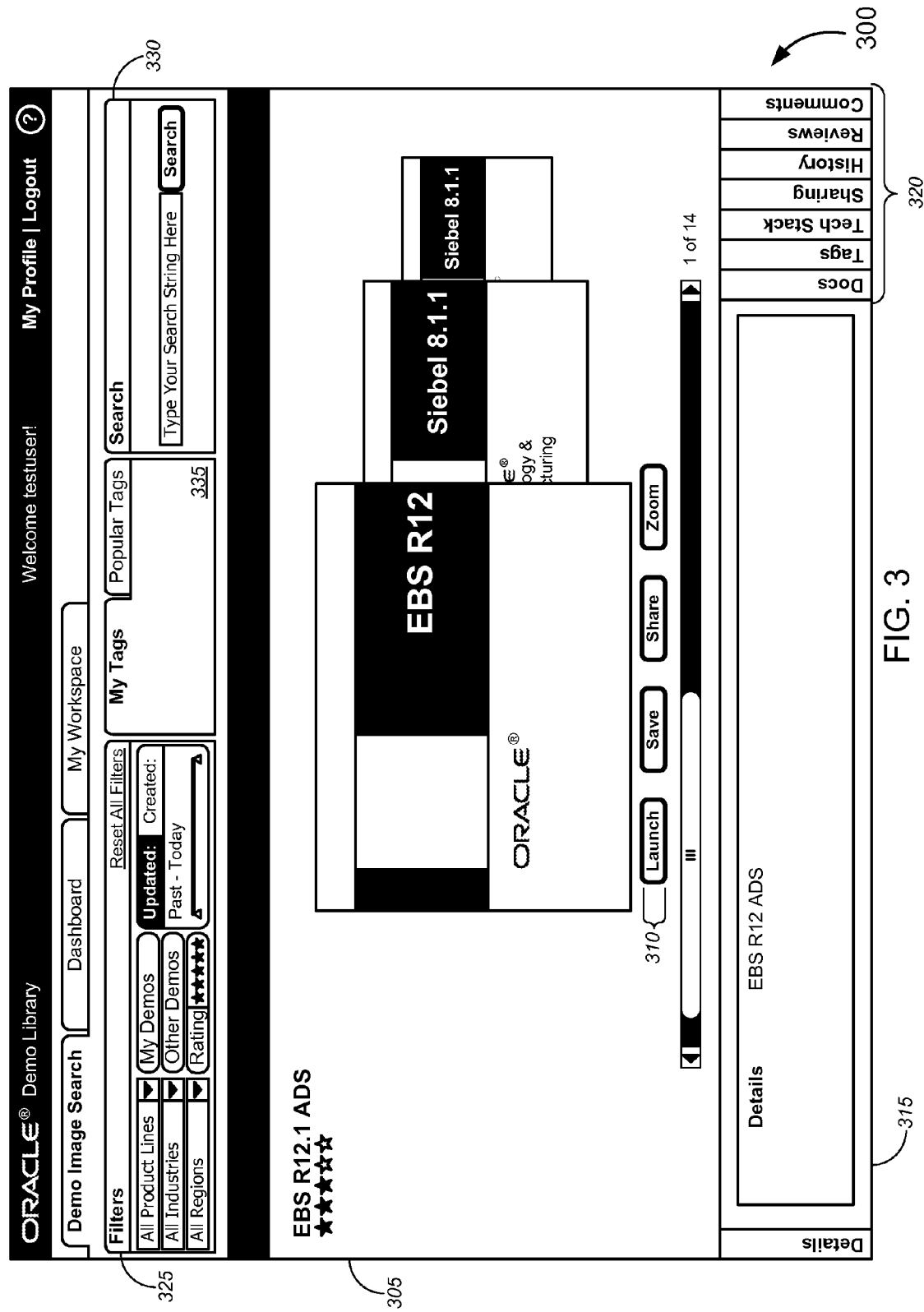
FIG. 3 is an exemplary screen diagram illustrating a user interface for managing virtual machines, in accordance with various embodiments.

In one aspect, the user interface allows a user to browse one or more of the machine images stored in the cloud computing environment. In another aspect, the user interface might provide information about each of the machine images available for browsing (block 215). Merely by way of example, FIG. 3 illustrates an exemplary screen display 300 of user interface that can be used to browse machine images. In the illustrated embodiment, the user interface comprises a region 305 that displays representations of machine images that are available for the user to instantiate (and/or copy to produce a new machine image that can be instantiated) The exemplary display 300 of the illustrated embodiment represents different machine images with graphical representations (which might be images of the "splash screen" of a particular application included with the machine image, images from packaging and/or marketing literature of such an application, and/or the like) to allow for easy identification of machine images by the user. Moreover, in the illustrated embodiment, the representations of the machine images are presented in a "rolling" format, which allows a user to scroll through the representations of available machine images; this feature provides a level of interactivity that can enhance the user's browsing experience. Of course, it should be appreciated that, in other embodiments, different display formats (such as a list of machine images, perhaps organized hierarchically, a grid of representations of machine images, and/or the like) may be employed. Optionally, the display region 305 may include a user interface element that displays an average rating awarded by other users to the machine image currently in focus.

In the illustrated embodiment, the user interface also provides a set of controls 310 that can be used to manage virtual machines. Merely by way of example, in the illustrated embodiment, the user interfaced includes a "Launch" button that the user can activate (click on) to select a particular machine image—the selection of a machine image in this fashion might cause the system (depending on the circumstances, as described below) to instantiate the selected image and/or to copy the image to create a new image that can be instantiated. The user interface depicted by FIG. 3 includes further controls 310, such as a "save" button, which can be activated by the user to indicate that the user would like to close a virtual machine and/or store a machine image of that virtual machine's state, as well as a "share" button that can be used to indicate that a particular machine image can be shared by other users (either to re-instantiate or to copy as a new machine image, as appropriate under the circumstances).

The user interface shown by FIG. 3 further comprises a region 315 for displaying information about a machine image that currently has focus in the user interface. This region 315 might include details about the machine image (and/or the application environment of the virtual machine corresponding to the machine image, such as a description of the operating system, applications, etc. installed in the application environment, any customization of the application environment, and/or the like). The information region 315 might provide other information as well. For instance, in the illustrated embodiment, different types of information are organized using a tabbed structure, with tabs 320 to hold information such as documentation about the machine image (and/or applications in the virtual machine's application environment, etc.), tags applied by the current and/or other users to particular machine image, information about the technology stack of the machine image (e.g., the operating system, middleware, drivers, etc. that may be used to support the applications in the virtual machine's application environment), sharing information about machine image (e.g., whether the machine image a shareable, which users have shared the machine image, which users can directly access the virtual machine represented by the machine image, etc.), information about the history of the machine image (e.g., the provenance of the image, usage history of the image, etc.), and/or information about reviews, comments, etc. provided by other users about the machine image. Based on these examples, one of skill in the art should understand that the user interface can be used to display a wide variety of different types of information about machine image, and that a variety of display formats can be used to display this information. Accordingly, the example described above should not be considered limiting and is provided merely for illustrative purposes.

In particular embodiments, the user interface provides a filter interface 325, which the user can employ to filter the list of available machine images by one or more criteria. Such criteria can include, without limitation, image creation and/or modification dates, the purpose and/or category of each image's application environment (e.g., business applications, firewalls, etc.), vendors and/or product lines of programs installed on the machine images, and/or any other useful criteria. Merely by way of example, a user might wish to filter the list of available machine images to include only images with an application environment comprising one or more applications from Oracle Corporation, and/or to include only images that comprise Oracle's E-Business Suite. Depending on the context, other filter criteria may be helpful as well. Merely by way of example, and embodiments configured to provide virtual machines for demonstration purposes, machine images might be customized to match various demographics of potential customers, such as industry, regions, and/or the like. In other cases, the user interface might include a filter mechanism to allow the user to instruct the user interface to show only machine images created by that user and/or by other users, to show only images with a certain rating, etc. In an aspect, once the user applies one or more filter criteria, the display region 305 of the user interface is modified to show only machine images that meet the filter criteria.

In certain embodiments, users can apply tags to machine images. These tags may pertain to a characteristic of a machine image, and can provide a quick heuristic for users to employ when assessing various machine images. The user interface, therefore, may include a region 335 in which the tags applied to the machine image currently in focus (or highlighted, etc.) may be displayed.

In the illustrated embodiment, the user interface also features a search facility 330, which allows the user to input search criteria. The tools provided by various embodiments may be configured to search some and/or all of the information about each machine image to find machine images that match the search criteria. In such cases the display region 305 may be modified to show only machine images that meet the search criteria.

At block 220, the method 200 comprises receiving a selection of a machine image that corresponds to a particular virtualized computer system the user would like to run (block 220) (e.g., a machine image for a virtual machine having application environment similar to the user's desired application environment—for example, a user might want to use an application environment with a particular operating system and a particular version of a given application). In some cases, the user's selection might be based, at least in part, on some or all of the information about that machine image provided by the user interface. In an aspect, the selection of the machine image is received via the user interface (e.g., by detecting the user pressing a "launch" button—through submission of a web form, as a JavaScript event, or using any other technique for detecting input in a user interface—as in the example depicted by FIG. 3).

The user selection might correspond to a machine image that the user created previously, and/or that belongs to the user (in other words, a machine image that the user is allowed to interact with), or that another has given the user access to. This scenario is described in detail below.

In other cases, the user might select a "stock" machine image; that is, a machine image that can serve as a template for the user to create his own machine image, but that the user does not have the right to modify directly. In such cases, launching a machine image might not instantiate the virtual machine represented by that image but might instead cause the system to copy that machine image as a new machine image. In this way, the state of the virtual machine from which the original machine image was made can be preserved, and the user can be allowed to use (and, as described below, potentially to modify and save an image of) a replica of that virtual machine. In such circumstances, when a user selects a particular machine image to launch, the system will create a new machine image based on the selected machine image (block 225). This new machine image, in effect, will correspond to a new virtual machine which comprises an application environment identical to that of the selected machine image, but which belongs to the user that selected the machine image. (Of course, certain embodiments might provide the user with a facility to assign ownership of the machine image to another user, or to determine access rights to the machine image that the user has created.)

The new machine image can then be instantiated from the newly-created machine image (block 330) (or, more precisely, a new virtual machine can be instantiated based on the information in the new machine image). The procedures for creating a new machine image and/or instantiating a virtual machine from that machine image will often vary depending on the nature of the client computer environment in which the virtual machine will run; typically, the process will involve execution of one or more command line statements, often with various command-line arguments and/or parameters. The tools provided by certain embodiments relieve the user is having to learn and remember such complicated commands. Rather, the user need only machine image and instruct the tools to launch virtual machine from that image, and the tools handle the details of this process.

Once the virtual machine has been instantiated, the user can be given access to interact with application environment of the new virtual machine. In some cases, the user interface is configured to provide this access. Merely by way of example, in a set of embodiments, the virtual machine may be configured to provide user interaction via a webpage (and/or a downloadable Java client, etc.), and the user interface may be designed to redirect the user to the appropriate webpage, invoke the Java client, etc.

In certain circumstances, the user's interaction with the application environment may involve customization of the application environment. Merely by way of example, the machine image selected by the user might feature an application environment that is close to the environment the user desires to use, but is not exactly what the user desires. For instance, the user might need applications in addition to those already included in the application environment, and/or the user might wish to customize applications already installed (e.g., by letting a database with particular data, configuring an application for a particular implementation, and/or the like). To illustrate this principle, consider the situation in which a salesperson desires to demonstrate an application for potential customer. The "stock" machine image might have the appropriate operating system and applications installed, but to provide a truly effective demonstration, the salesperson might wish to populate a database with some of the customer's data, customize an applications operating parameters to match the customers implementation configuration, and/or the like. Accordingly, the salesperson might interact with the application environment to implement these modifications. As another example, an application tester might need to test an application environment that has an operating system and/or an application in a particular patch level. A "stock" machine image might have the appropriate versions of the operating system and/or the applications, but might not have the patches that need to be tested applied to these programs. Upon instantiating the virtual machine, the tester might interact with the application environment by applying the desired patches to the operating system and the applications.

Accordingly, the user's interaction with the application environment might comprise making modifications to the application environment. (Of course, in some case the user might simply interact with the application environment, e.g., by using the applications therein, without otherwise modifying the application environment, although even use of the application might result in a change in the state of the virtual machine and therefore could, in some cases, be considered as modifying the virtual machine and/or its application environment.) Hence, the method 200 may comprise customizing the application environment of the new virtual machine, based at least in part on the user interaction with the application environment (block 235). In such circumstances, the application environment of the new virtual machine may be considered a customized application environment.

At block 240, the method 200 comprises receiving an indication that the user has finished interacting with this customized application environment. In some cases, this indication may be received by the user interface of the tools provided by various embodiments. In some cases, the user may have no further need to use the application environment; in other cases, however the user might wish to save the state of the virtual machine for further interaction at later time, and when indicating that he or she is finished interacting with the virtual machine (and/or its application environment), the user might also indicate that the application environment should be saved for further interaction at a later time. For instance, by reference to the example user interface of FIG. 3, the user might trigger the "save" button to indicate that the user is finished interacting with the application environment but that the state of the virtual machine should be saved.

Upon receiving such an indication, the tools provided by certain embodiments will save the state of the virtual machine (e.g., by updating the machine image for that virtual machine) and will store the machine image that represents the virtual machine in persistent storage (e.g., in persistent storage maintained by a client computing environment) (block 245). The user may wish to provide information about this machine image (either for him or herself or for other users) such as a description of the application environment and or how it had been customized to meet the user's needs. Accordingly, the user interface may provide a facility for receiving information about the machine image (block 250). In some cases, the information about the machine image may comprise an indication that the user would like the machine imaged be shared with other users. Merely by way of example, referring again to FIG. 3, the user might trigger a "share" button in the user interface to indicate that the machine image can be shared with other users.

Likewise, the user interface may be used to receive information from users about other machine images as well. Merely by way of example, the user interface may provide a mechanism for users to rate machine images (according to any appropriate criteria, such as ease of use, suitability for demonstration purposes, and/or the like) and/or to provide textual comments about various machine images (e.g., circumstances in which use of the machine image might be appropriate or inappropriate, comments about problems with the machine image, etc.).

The method 200 may further comprise displaying information about the new machine image in the user interface (block 255). For example, if a user creates and customizes a new machine image, and indicates that the then new machine image can be shared with others, that new machine image may be included in the list of machine images that are displayed for other users to select (the display of this machine image may, of course, include any information, provided by the user that created the machine image and/or by others, about that machine image). At this point, if the user has selected to share the machine image he created and/or customized, the machine images available for selection (and/or further customization) by another user, as indicated by the broken line on FIG. 2. For instance, a user may select a "stock" machine image, customize that machine image, and share the customized machine image, and another user may select that customized machine image, customize it further, and share their further customize machine image for other users. This process can be repeated iteratively as needed and/or desired by users.

In some cases, a user may wish to return to a machine image that he used previously. In such a case, the user can select the machine image using the user interface, a request further interaction with the application environment that machine image. Merely by way of example, if the user chooses to launch a machine image that is owned by that user, the user interface, rather than creating a new machine image, might simply re-instantiate the virtual machine from selected machine image. To illustrate this concept, FIG. 4 illustrates a method 400 of tracking user's interaction with the machine image. The method 400 comprises receiving (e.g. via the user interface) a request to access a machine image for further interaction (block 405). As mentioned such a request might take the form of a request to launch a machine image that belongs to the user (similar to the procedures described above for receiving selection of a machine image, except that, in this case, the selected machine image belongs to the user making the request, and/or the user making the request has permission to access and modify the selected machine image). Alternatively and/or additionally, the user interface might provide the user with options to either re-instantiate a virtual machine from the machine image (if allowed) or to create a new machine image based on the selected machine image (and instantiate a new virtual machine from that new machine image).

In any event, in response to receiving a request for further interaction with a virtual machine's application environment, the tools may be configured to re-instantiate that virtual machine (block 410). (As noted above, when a virtual machine is re-instantiated, it typically will inherit its state as of the time the machine image was stored.) The tools provided by certain embodiments will track an amount of time the virtual machine is instantiated (block 415), e.g., by starting a timer when the virtual machine is instantiated, stopping the timer when the virtual machine is stopped, and repeating the process every time the virtual machine is instantiated, to keep a running total of the time the virtual machine has been instantiated. The tools, in some embodiments, also account for use of the virtual machine based (at least in part) on the amount of time the machine was instantiated (block 420). Merely by way of example, the user might only be charged for the virtual machine when the user is actually using the virtual machine (or at least, when the virtual machine is instantiated); hence, for example, the user might be charged a per-minute rate for every minute the virtual machine is instantiated. Alternatively, the user might be charged one rate (e.g., a relatively low monthly rate) merely for the storage of the virtual machine in the cloud computing environment, and the user might be charged another, higher rate for the time in which the machine is actually instantiated.

Figure 5:
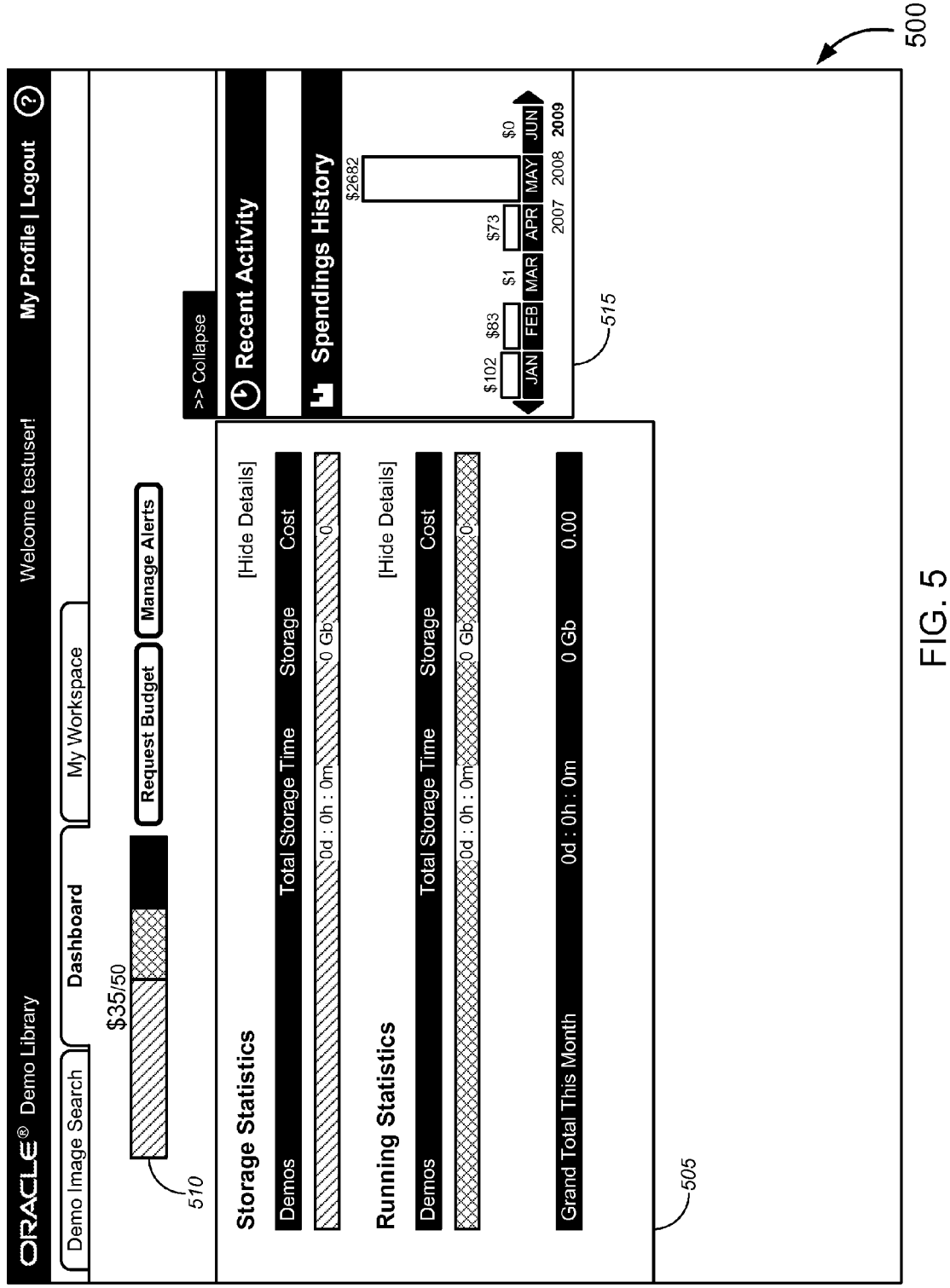
FIG. 5 is an exemplary screen diagram illustrating a user interface for managing virtual machines, in accordance with various embodiments.

In some embodiments, the user interface is configured to display accounting information about the usage of the virtual machine (block 425). Merely by way of example, FIG. 5 illustrates an exemplary screen display 500 from a user interface that displays accounting information. In the example depicted by FIG. 5, the user interface includes a statistics region 505, which displays (using a tabular format in the illustrated embodiment) statistics about the amount of storage space used for one or more of the machine images belonging to the user, along with a storage time and cost for storage of these machine images. In the illustrated embodiment, he statistics region 505 also includes a display of statistics about the instantiation time of each virtual machine, and the cost for such instantiation time.

In some embodiments, the user interface may also include a display region 510 that compares the user's current usage against a budgeted amount (of dollars, instantiation time, etc.) and/or a display region that displays (graphically, in the embodiment shown by FIG. 5), historical data about costs for maintaining and/or using the user's virtual machines. It should be appreciated, of course, that the information displayed, and the format of the display, can vary according to the embodiment, and that FIG. 5 is provided merely for descriptive purposes and should not be considered limiting.

As noted above, one advantage of certain embodiments is that they allow a user to demonstrate, test, etc. an application environment on a virtual machine and then export that environment for use on an actual computer system (i.e., a dedicated hardware platform). FIG. 6, therefore, illustrates a method 600 of exporting a virtual machine, in accordance with one set of embodiments. The method 600 comprises receiving an indication that the virtual machine should be exported (block 605). In an aspect, this indication can be received via the user interface (e.g., via an "export" button on the user interface, etc.). In response to receiving such an indication, the tools may export the virtual machine's application environment for installation on an actual computer system (block 610). The specific procedures for exporting an application environment may vary by implementation. Merely by way of example, in some cases, at the initial machine image creation, each instance is allocated with two elastic block system ("EBS") storages with various sizes depending upon each application space requirement. The first EBS, or mount point, may be used for all your uploaded install files, while the second EBS may be used for application installation. In an aspect, all installed files may be stored on a mounted storage to allow for the capture and packaging of subsequently cloned instances (which may be exported). In another aspect, the convention used for mounted EBS devices may be as follows: first mount: /dev/sdh, second mount: /dev/sdi, and so on. In some cases, the mount point name convention is applicationname_vol1, applicationname_vol2, and so on. For cloned environments, there may be only one EBS storage created from the save application snapshot. It might be mounted under device /dev/sdh and the same mount point name as the original image.

The export features provided by various embodiments can provide a number of benefits. Merely by way of example, a virtual machine might comprise an application environment that a user has customized for demonstrating an application for a potential customer, and the application environment might be exported for installation on an actual computer system operated by the customer. As another example, a virtual machine might comprise an application environment that has been customized for testing an application, and the application environment might be exported for installation on a production computer system. Based on these examples, one skilled in the art will appreciate that application environments can be exported for a wide variety of reasons.

Figure 7:
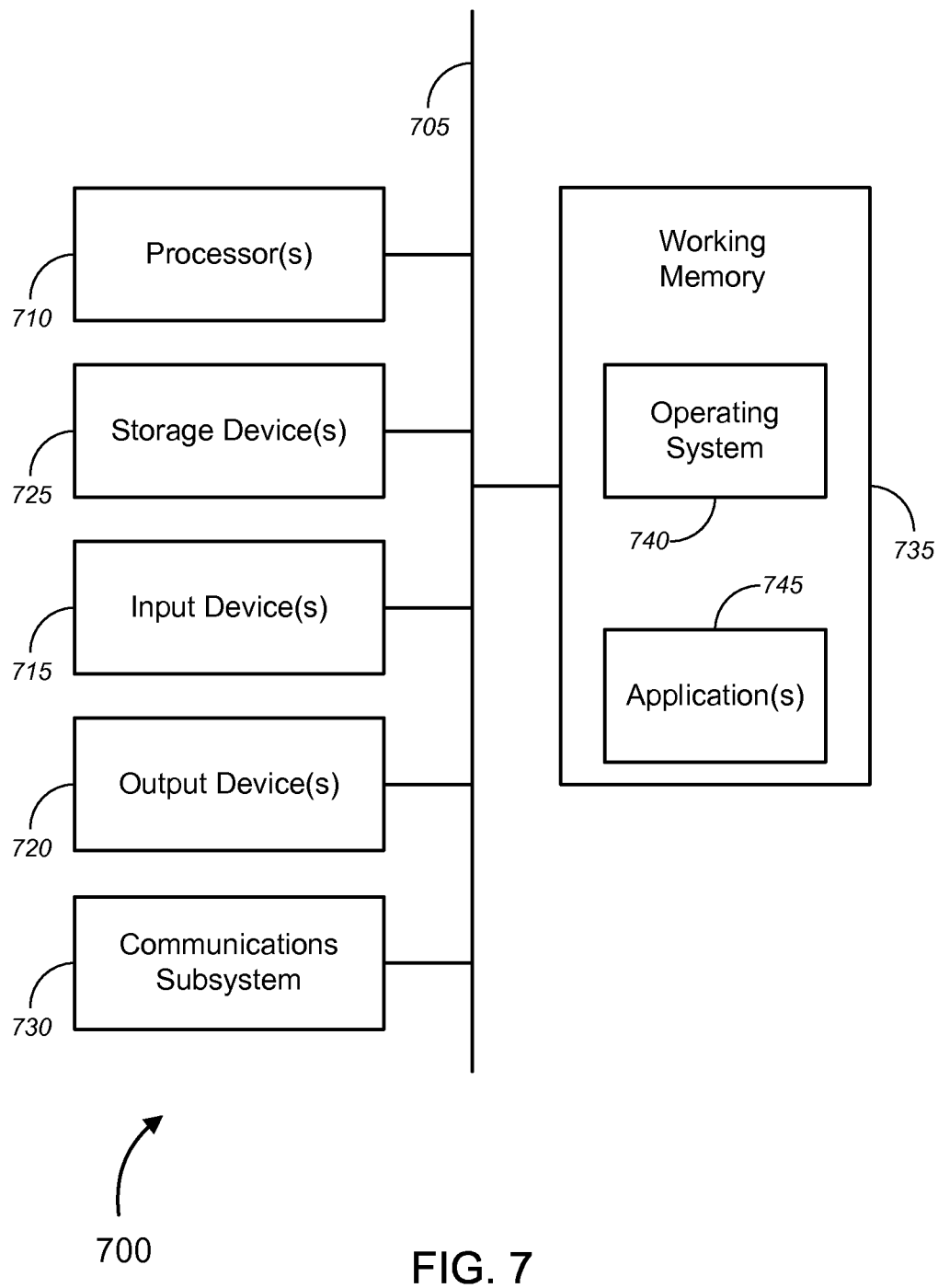
FIG. 7 is a generalized schematic diagram illustrating a computer system, in accordance with various embodiments of the invention.

FIG. 7 provides a schematic illustration of one embodiment of a computer system 700 that can perform the methods provided by various other embodiments, as described herein, and/or can function as a user computer, a production system, an interface server, etc. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operation in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
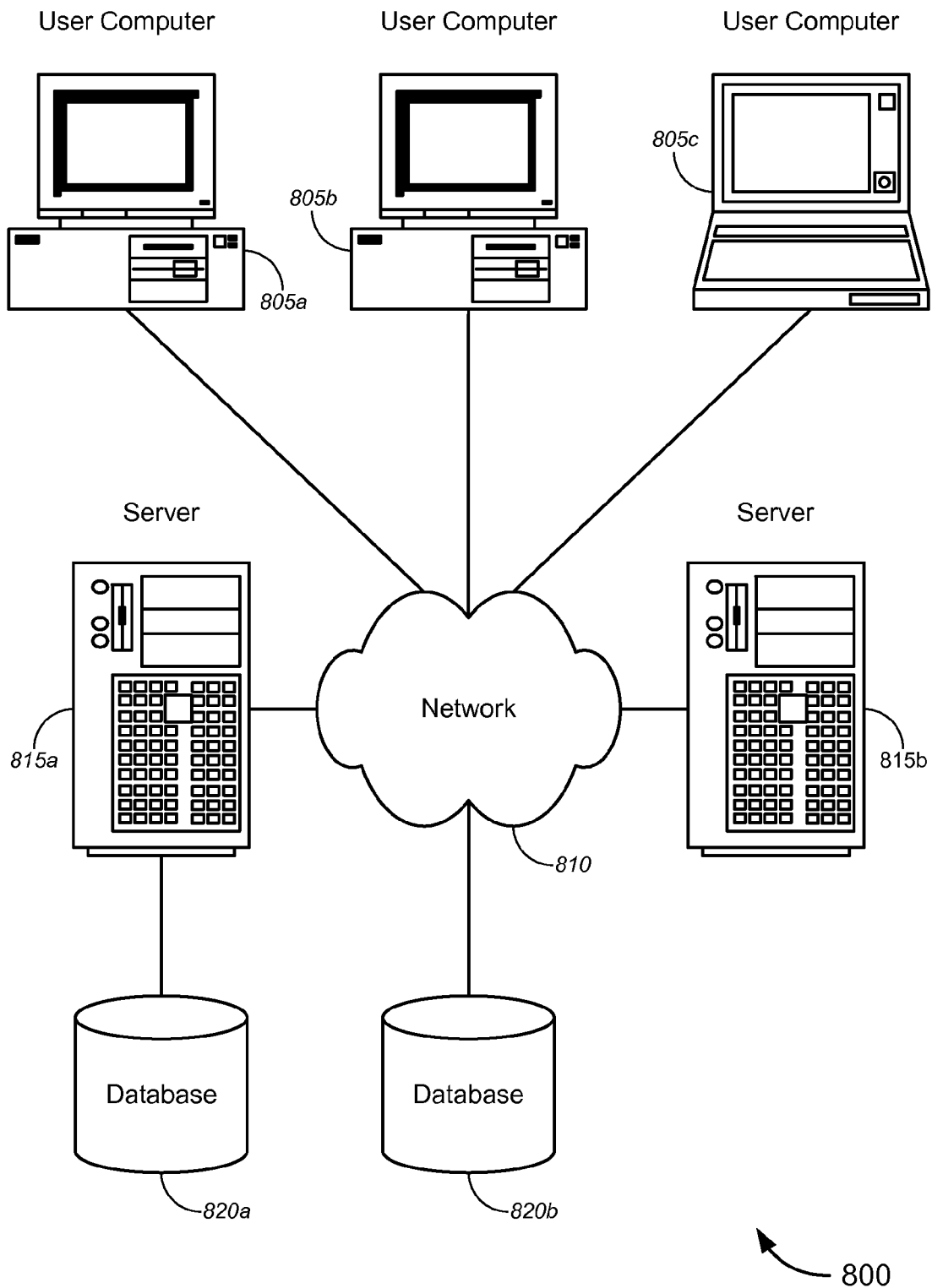
FIG. 8 is a block diagram illustrating a networked system of computers, which can be used in accordance with various embodiments of the invention.

A set of embodiments comprises systems for managing virtual machines Merely by way of example, FIG. 8 illustrates a schematic diagram of a system 800 that can be used in accordance with one set of embodiments. The system 800 can include one or more user computers 805. The user computers 805 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 805 can also have any of a variety of applications, including one or more applications configured to perform methods provided by various embodiments (as described above, for example), as well as one or more office applications, database client and/or server applications, and/or web browser applications. Alternatively, the user computers 805 can be any other electronic device, such as a thin-client computer, Internet-enabled mobile telephone, and/or personal digital assistant, capable of communicating via a network (e.g., the network 810 described below) and/or displaying and navigating web pages or other types of electronic documents. Although the exemplary system 800 is shown with three user computers 805, any number of user computers can be supported.

Certain embodiments of the invention operate in a networked environment, which can include a network 810. The network 810 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 810 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 815. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 805 and/or another server 815. In some embodiments, an application server can create web pages dynamically for displaying the information in accordance with various embodiments, such as for displaying a user interface to manage virtual machines, for providing interaction with a virtual machine, etc. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 835 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A computer system, comprising:
one or more processors; and
a computer readable medium in communication with the one or more processors, the computer readable medium having encoded thereon a set of instructions executable by the computer system to perform one or more operations, the set of instructions comprising:
  instructions for storing, in a cloud computing environment that provides pooled processing resources, a plurality of machine images, each machine image corresponding to a virtualized computer system;
  instructions for providing a graphical user interface for users to browse the plurality of images, the graphical user interface providing information about each machine image of the plurality of machine images, the information comprising user comments about one or more machine images of the plurality of machine images, wherein the graphical user interface allows the users to scroll through a list of available machine images, and wherein the graphical user interface comprises a region for displaying detailed information about a currently-highlighted machine image in the list of available machine images;
  instructions for receiving, from a first user and via the graphical user interface, a selection of a first machine image corresponding to a first virtualized computer system, the first virtualized computer system comprising an application environment for demonstrating an application;
  instructions for creating, in response to the selection of the first machine image, a second machine image based on the first machine image, the second machine image corresponding to a second virtualized computer system comprising the application environment;
  instructions for instantiating the second virtual computer system, based on the second machine image, using pooled resources associated with the cloud computing environment, to display the application environment of the second virtualized computer system for the first user and allow the first user to interact with the application demonstrated within the second virtualized computer system through a web-based interface;
  instructions for customizing the application environment of the second virtualized computer system, based at least in part on user usage of the application demonstrated within the second virtualized computer system and a selected patch level, wherein the user usage of the application through the web-based interface produces a customized application environment for demonstrating the application for a first customer with one or more patches corresponding to the selected patch level applied;
  instructions for receiving, via the web-based interface, an indication from the first user that the first user has finished interacting with the customized application environment of the second virtualized computer system but that the customized application environment should be saved for further user interaction at a later time;
  instructions for storing the second machine image, corresponding to the second virtualized computer system, in the cloud computing environment that provides the pooled processing resources, based at least in part on the indication from the first user;
  instructions for receiving, via the graphical user interface, user input indicating that that the customized application environment should be exported; and
  instructions for exporting the customized application environment for installation on an actual computer system that is external to the cloud computing environment that provides the pooled processing resources.

2. A method, comprising:
providing a web-based graphical user interface for users to browse a plurality of machine images stored in a cloud computing environment that provides pooled processing resources, each machine image of the plurality of machine images corresponding to a virtualized computer system, the web-based graphical user interface providing information about each machine image of the plurality of machine images, the information comprising user comments about one or more machine images of the plurality of machine images, wherein the web-based graphical user interface allows users to scroll through a list of available machine images, and wherein the web-based graphical user interface comprises a region for displaying detailed information about a currently-highlighted machine image in the list of available machine images;
wherein the web-based graphical user interface comprises a mechanism through which a particular user can share, with a plurality of other users through the web-based graphical user interface, a particular machine image that the particular user customized by using an application through the web-based graphical user interface;
receiving, from a first user and via the web-based graphical user interface, a selection of a first machine image corresponding to a first virtualized computer system, the first virtualized computer system comprising an application environment;

creating, in response to the selection of the first machine image, a second machine image based on the first machine image, the second machine image corresponding to a second virtualized computer system comprising the application environment;

instantiating the second virtualized computer system, based on the second machine image, using the pooled processing resources associated with the cloud computing environment, to display the application environment of the second virtualized computer system for the first user and allow the first user to use a particular application within the second virtualized computer system through the web-based graphical user interface;

customizing the application environment of the second virtualized computer system, based at least in part on user usage of the application within the second virtualized computer system and a selected patch level, wherein the user usage of the application through the web-based user interface produces a customized application environment with one or more patches corresponding to the selected patch level applied; and storing the second machine image, corresponding to the second virtualized computer system, within pooled storage resources of the cloud computing environment.

3. An apparatus, comprising:

a computer readable non-transitory medium having encoded thereon a set of instructions executable by a computer system to perform one or more operations, the set of instructions comprising:

instructions for providing a web-based graphical user interface for users to browse a plurality of machine images stored in a cloud computing environment that provides pooled processing resources, each machine image of the plurality of machine images corresponding to a virtualized computer system, the web-based graphical user interface providing information about each machine image of the plurality of machine images, the information comprising user comments about one or more machine images of the plurality of machine images, wherein the web-based graphical user interface allows the users to scroll through a list of available machine images, and wherein the web-based graphical user interface comprises a region for displaying detailed information about a currently-highlighted machine image in the list of available machine images;

wherein the web-based graphical user interface comprises a mechanism through which a particular user can share, with a plurality of other users through the web-based graphical user interface, a particular machine image that the particular user customized by using an application through the web-based graphical user interface;

instructions for receiving, from a first user and via the web-based graphical user interface, a selection of a first machine image corresponding to a first virtualized computer system, the first virtualized computer system comprising an application environment;

instructions for creating, in response to the selection of the first machine image, a second machine image based on the first machine image, the second machine image corresponding to a second virtualized computer system comprising the application environment;

instructions for instantiating the second virtualized computer system, based on the second machine image, using the pooled processing resources associated with the cloud computing environment, to display the application environment of the second virtualized computer system for the first user and allow the first user to use a particular application within the second virtualized computer system through the web-based graphical user interface;

instructions for customizing the application environment of the second virtualized computer system, based at least in part on user usage of the application within the second virtualized computer system and a selected patch level, wherein the user usage of the application through the web-based interface produces a customized application environment with one or more patches corresponding to the selected patch level applied; and instructions for storing the second machine image, corresponding to the second virtualized computer system, within pooled storage resources of the cloud computing environment.

4. The apparatus of claim 3, wherein the web-based graphical user interface allows users to filter the plurality of machine images by one or more criteria.

5. The apparatus of claim 4, wherein at least one criterion pertains to a configuration of an application in an application environment of the virtualized computer system in each of the plurality of machine images.

6. The apparatus of claim 3, wherein the set of instructions further comprises:

instructions for displaying, in the web-based graphical user interface, information about the second machine image for one or more users other than the first user.

7. The apparatus of claim 6, wherein the set of instructions further comprises:

instructions for receiving, from a second user and via the web-based graphical user interface, a selection of the second machine image;

instructions for creating, in response to the selection of the second machine image, a third machine image based on the second machine image, the third machine image corresponding to a third virtualized computer system comprising the customized application environment;

instructions for instantiating the third virtualized computer system, based on the third machine image, to display the customized application environment of the third virtualized computer system for the second user and allow the second user to interact with the customized application environment of the third virtualized computer system;

instructions for further customizing the application environment of the third virtualized computer system based at least in part on user interaction with the application environment of the third virtualized computer system, such that the third virtualized computer system comprises a second customized application environment; and instructions for storing the third machine image, corresponding to the third virtualized computer system, in the cloud computing environment.

8. The apparatus of claim 3, wherein the set of instructions further comprises:

instructions for receiving, via the web-based graphical user interface, information about the second machine image; and instructions for displaying, in the web-based graphical user interface, the information about the second machine image.

9. The apparatus of claim 8, wherein the information about the second machine image comprises user comments about the second machine image.

10. The apparatus of claim 3, wherein the set of instructions further comprises:
   instructions for receiving, via the web-based graphical user interface, an indication from the first user that the first user has finished interacting with the customized application environment of the second virtualized computer system but that the customized application environment should be saved for further user interaction at a later time, wherein the instructions for storing the machine image comprise instructions for storing the machine image based on the indication from the first user;
   instructions for receiving, via the web-based graphical user interface, a request to access the second virtualized computer system for further user interaction; and
   instructions for re-instantiating the second virtualized computer system, in response to the request, to allow further user interaction with the application environment of the second virtualized computer system.

11. The apparatus of claim 10, wherein the set of instructions further comprises:
   instructions for tracking an amount of time in which the second virtualized computer system is instantiated; and
   instructions for accounting for use of the second virtualized computer system, based at least in part on the amount of time in which the second virtualized computer system is instantiated.

12. The apparatus of claim 11, wherein the web-based graphical user interface displays accounting information about usage of the second virtualized computer system.

13. The apparatus of claim 3, wherein the set of instructions further comprises:
   instructions for exporting the customized application environment for installation on an actual computer system, based at least in part on user input, received via the web-based graphical user interface, indicating that that the customized application environment should be exported.

14. The apparatus of claim 3, wherein the first virtualized computer system comprises an application environment for demonstrating an application to a potential customer.

15. The apparatus of claim 3, wherein the first virtualized computer system comprises an application environment for testing an application.

16. A method, comprising:
   providing a web-based graphical user interface for users to manage one or more of a plurality of machine images stored in a cloud computing environment that provides pooled processing resources, each of the plurality of machine images corresponding to a virtualized computer system, wherein the web-based graphical user interface allows the users to scroll through a list of available machine images, and wherein the web-based graphical user interface comprises a region for displaying detailed information about a currently-highlighted machine image in the list of available machine images;
   wherein the web-based graphical user interface comprises a mechanism through which a particular user can share, with a plurality of other users through the web-based graphical user interface, a particular machine image that the particular user customized by using an application through the web-based graphical user interface;
   receiving, from a first user and via the web-based graphical user interface, a selection of a first machine image corresponding to a first virtualized computer system, the first virtualized computer system comprising an application environment;
   creating, in response to the selection of the first machine image, a second machine image based on the first machine image, the second machine image corresponding to a second virtualized computer system comprising the application environment;
   storing the second machine image within pooled storage resources of the cloud computing environment;
   instantiating the second virtualized computer system, based on the second machine image, using the pooled processing resources associated with the cloud computing environment, to display the application environment of the second virtualized computer system for the first user and allow the first user to use a particular application within the second virtualized computer system through the web-based graphical user interface;
   customizing the application environment of the second virtualized computer system, based at least in part on user usage of the application within the second virtualized computer system and a selected patch level, wherein the user usage of the application through the web-based graphical user interface produces a customized application environment with one or more patches corresponding to the selected patch level applied;
   receiving, through the web-based graphical user interface, user input indicating that that the customized application environment should be exported; and
   exporting the customized application environment for installation on an actual computer system external to the cloud computing environment that provides the pooled processing resources, based at least in part on the user input.

17. An apparatus, comprising:
   a computer readable non-transitory medium having encoded thereon a set of instructions executable by a computer system to perform one or more operations, the set of instructions comprising:
   instructions for providing a web-based graphical user interface for users to manage one or more of a plurality of machine images stored in a cloud computing environment that provides pooled processing resources, each of the plurality of machine images corresponding to a virtualized computer system, wherein the web-based graphical user interface allows the users to scroll through a list of available machine images, and wherein the web-based graphical user interface comprises a region for displaying detailed information about a currently-highlighted machine image in the list of available machine images;
   wherein the web-based graphical user interface comprises a mechanism through which a particular user can share, with a plurality of other users through the web-based graphical user interface, a particular machine image that the particular user customized by using an application through the web-based graphical user interface;
   instructions for receiving, from a first user and via the web-based graphical user interface, a selection of a first machine image corresponding to a first virtualized computer system, the first virtualized computer system comprising an application environment;
   instructions for creating, in response to the selection of the first machine image, a second machine image based on the first machine image, the second machine image corresponding to a second virtualized computer system comprising the application environment;

instructions for instantiating the second virtualized computer system, based on the second machine image, using the pooled processing resources associated with the cloud computing environment, to display the application environment of the second virtualized computer system for the first user and allow the first user to use a particular application within the second virtualized computer system through the web-based graphical user interface;

instructions for customizing the application environment of the second virtualized computer system, based at least in part on user usage of the application within the second virtualized computer system and a selected patch level, wherein the user usage of the application through the web-based graphical user interface produces a customized application environment with one or more patches corresponding to the selected patch level applied;

instructions for exporting the customized application environment for installation on an actual computer system external to the cloud computing environment that provides the pooled processing resources, based at least in part on user input indicating that that the customized application environment should be exported.

18. The apparatus of claim 17, wherein the second virtualized computer system comprises a customized application environment for demonstrating an application for a potential customer, and wherein the customized application environment is exported for installation on a computer system operated by the potential customer.

19. The apparatus of claim 17, wherein the second virtualized computer system comprises a customized application environment for testing an application, and wherein the customized application environment is exported for installation on a production computer system.

* * * * *

UNITED STATES PATENT AND TRADEMARK OFFICE
CERTIFICATE OF CORRECTION

PATENT NO. : 9,448,852 B2
APPLICATION NO. : 12/549529
DATED : September 20, 2016
INVENTOR(S) : Vemulapalli et al.

Page 1 of 1

It is certified that error appears in the above-identified patent and that said Letters Patent is hereby corrected as shown below:

In the Specification

In Column 3, Line 18, delete "one or ore" and insert -- one or more --, therefor.

In Column 4, Line 19, delete "that that" and insert -- that --, therefor.

In Column 4, Line 37, delete "images;" and insert -- images. --, therefor.

In Column 5, Line 3, delete "that that" and insert -- that --, therefor.

In Column 14, Line 7, delete "and or" and insert -- and/or --, therefor.

In Column 17, Line 37, delete "and or" and insert -- and/or --, therefor.

In the Claims

In Column 22, Line 33, in Claim 1, delete "that that" and insert -- that --, therefor.

In Column 25, Lines 39-40, in Claim 13, delete "that that" and insert -- that --, therefor.

In Column 26, Line 28, in Claim 16, delete "that that" and insert -- that --, therefor.

In Column 28, Line 3, in Claim 17, delete "that that" and insert -- that --, therefor.

Signed and Sealed this
Twenty-fifth Day of April, 2017

Michelle K. Lee
*Director of the United States Patent and Trademark Office*